United States Patent [19]
Becavin et al.

[11] 3,790,942
[45] Feb. 5, 1974

[54] RADIO BEACON WITH A ROTATING CARDIOID RADIATION PATTERN IN PARTICULAR FOR USE IN LANDING GROUNDS OF SECONDARY IMPORTANCE

[75] Inventors: Henri Becavin; Michel Ronsin, both of Paris, France

[73] Assignee: Thomson-CSF, Paris, France

[22] Filed: May 25, 1972

[21] Appl. No.: 256,966

[30] Foreign Application Priority Data
June 1, 1971  France .............................. 7119689

[52] U.S. Cl............................................. 343/106 R
[51] Int. Cl............................................... G01s 1/40
[58] Field of Search ............................... 343/106 R

[56] References Cited
UNITED STATES PATENTS 2,253,958   8/1941   Luck ............................... 343/106 R
2,985,876   5/1961   Clough et al..................... 343/106 R
3,560,978   2/1971   Hummel et al. ................. 343/106 R Primary Examiner—Benjamin A. Borchelt
Assistant Examiner—Richard E. Berger
Attorney, Agent, or Firm—John W. Malley et al.

[57] ABSTRACT

A radio beacon which requires only a low power for its operation and in which maintenance is reduced to a minimum. The rotating lobe is produced by means of an antenna with three dipoles which, by switching, are successively fed in phase with the omnidirectional antenna and then successively, in phase opposition therewith, this giving six positions of the rotating cardioid diagram.

4 Claims, 3 Drawing Figures

RADIO BEACON WITH A ROTATING CARDIOID RADIATION PATTERN IN PARTICULAR FOR USE IN LANDING GROUNDS OF SECONDARY IMPORTANCE

The present invention relates to a miniaturised, low-cost low power consumption (it can be operated from a single battery) radio beacon with a rotating cardioid radiation pattern of the VOR type, which necessitates only minimal maintenance; radio beacons of this type are of particular interest in the context of short-range navigation and for equipping of landing grounds of secondary importance.

Those skilled in the art will appreciate that VOR radio beacons radiate a horizontally polarized first lobe rotating at a frequency of 30 c/s whose pattern in the E plane is that of a very short dipole, and a second lobe which is fixed and omnidirectional in the E plane.

The combination of these two lobes produces in the E plane a cardioid rotating radiation pattern which enables an aircraft to determine its azimuthal bearing in relation to the beacon by a comparison between the phase of the LF signal produced by an amplitude modulation receiver, and a reference phase furnished by a sub-carrier of the HF signal utilized for the omnidirectional radiation.

Two basic solutions are in use for the production of the rotary lobe.

1. Two radiator elements, with their axes at 90° to one another, are respectively supplied with two HF signals of the form sin R$t$. sin $wt$ and cos R$t$. sin $wt$ where R is the angular frequency of rotation of the lobe and $w$ the angular frequency of the HF carrier.

As those skilled in the art will appreciate, the production of signals of this kind necessitates complex circuitry.

2. A single rotating element is supplied with a pure HF carrier of the form sin $wt$, and this requires a motor which is a major drawback from the point of view of power consumption and maintenance.

The solution utilized in the radio beacon in accordance with the invention enables these drawbacks to be overcome.

In accordance with the invention, there is provided a radio beacon comprising first means for radiating a fixed lobe, and second means for radiating a rotating lobe forming with said fixed lobe a rotating cardioid radiation pattern, said second means including: an HF oscillator; $n$ dipoles, $n$ being an integer greater than 1, having the same centre of symmetry and regularly angularly spaced about said centre, said dipoles having respective input connections; and a switching device for, during each cycle corresponding to one revolution of said rotating lobe, successively supplying said $n$ dipoles from said HF oscillator during the course of the first half cycle and then repeating the operation by reversing the input connections of each of the dipoles, during the second half cycle.

The invention will be better understood and other of its features rendered apparent, from a consideration of the ensuing description and the related drawings in which.

Figure 1:
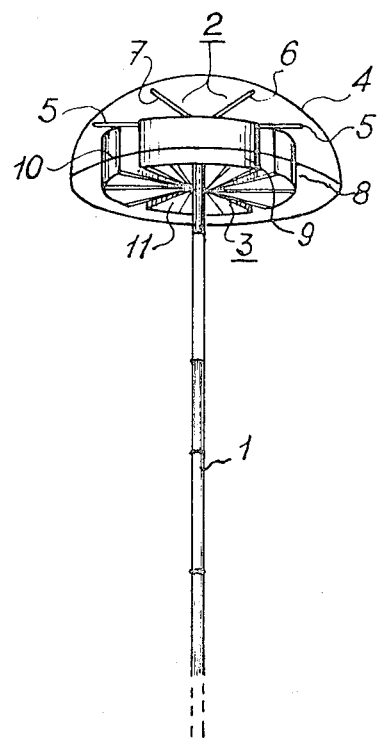
FIG. 1 is a perspective view of an embodiment of the radio beacon antenna in accordance with the invention.

The complex antenna of FIG. 1 has a mast the height of which may for example be 5 m and at the top of which there can be seen, partially visible, the antenna 2 used to radiate the rotating lobe and the antenna 3 used to radiate the fixed lobe. The assembly of these two antennas is protected by a dome 4.

The antenna 2 has three dipoles 5, 6 and 7, centre-fed and, as will be seen at a later point in this description, enabling six discrete positions of the rotating lobe to be produced during each cycle.

These dipoles are short ones, for example λ/6, compared with the operating wave length λ.

The antenna 3 is formed by four quadrants 8, 9, 10 and 11 associated with one another in pairs to form two centre-fed curved horizontal dipoles 8–9 and 10–11, the two dipoles being capacitively coupled with one another at their ends and the assembly forming a constant current loop to radiate the fixed lobe.

The feeder cables pass through the mast.

Figure 2:
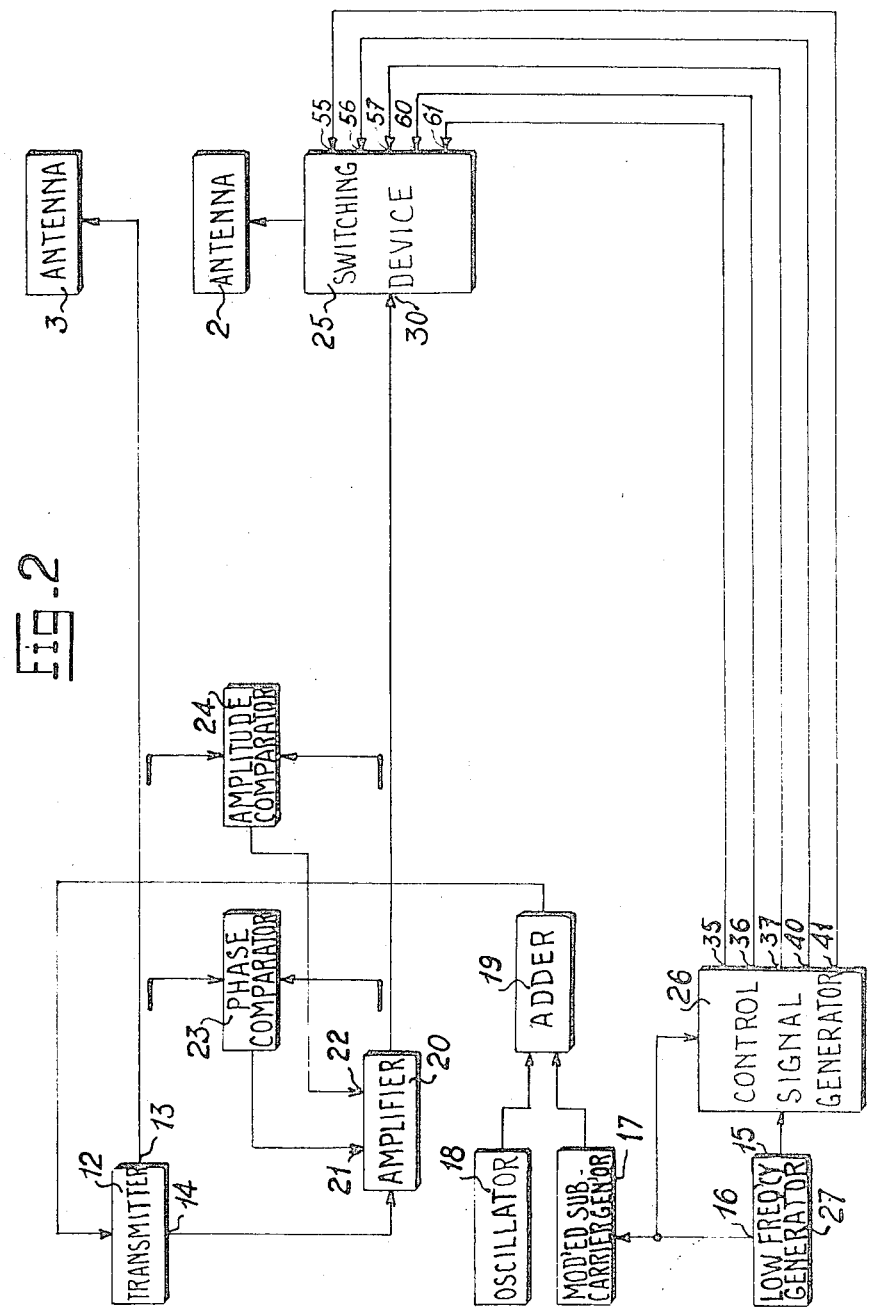
FIG. 2 is a diagram of the antenna feeder circuits.

FIG. 2 illustrates the feeder circuit for the two antennas. In this figure, a transmitter 12 with an oscillator and an amplitude modulator, supplies at its output 14 a pure sinusoidal HF wave of angular frequency $w$.

A low frequency generator 27, with a 180 c/s oscillator and a frequency divider which has a division factor of 6, respectively produces signals at 30 c/s and 180 c/s, from its outputs 16 and 15.

Its output 16 is connected to the modulating input of a circuit 17 which embodies a 9,960 c/s oscillator and a modulator, and which supplies a sub-carrier frequency modulated by a 30 c/s signal to supply the reference phase.

An oscillator 18, operating for example at 1,020 c/s supplies the beacon identification. The output signals from the oscillator 18 and the circuit 17 are added in an adder 19 to produce the modulation signal which is applied to the modulation input of the transmitter 12. The high frequency modulated signal obtained in this manner, is used to feed the antenna 3 through a balun and a two-wire line, neither of which has been shown, one of the two wires of the two-wire line being connected to the first inputs respectively terminating at the half dipoles 8 and 10, of the two curved dipoles 8–9 and 10–11, whilst the other wire is connected to the second inputs of these two dipoles.

The output 14 of the transmitter 12 produces a pure sinusoidal wave and is connected to the input of an amplifier 20 with a phase-control input 21 and an amplitude-control input 22, so that the modulated HF signal produced at the output 13 of the transmitter 12, and the output signal from the amplifier 20, can be maintained in the correct phase and correct amplitude ratio with the help of a phase comparator 23 and an amplitude comparator 24, each of which receives a fraction of the two aforesaid HF signals picked off by means of loops from the output cables of the transmitter 12 and the amplifier 20, the output signals from the two comparators being respectively applied to the control inputs 21 and 22 on the amplifier 20.

The output of the amplifier 20 is connected to the HF input 30 of a switching device 25 controlled by signals coming from a control signal generator 26 supplied with the 180° c/s and 30 c/s signals from the circuit 27.

The generator 26 has five outputs 35, 36, 37, 40 and 41 respectively connected to five control inputs 55, 56, 57, 60 and 61 of the switching device 25.

Figure 3:
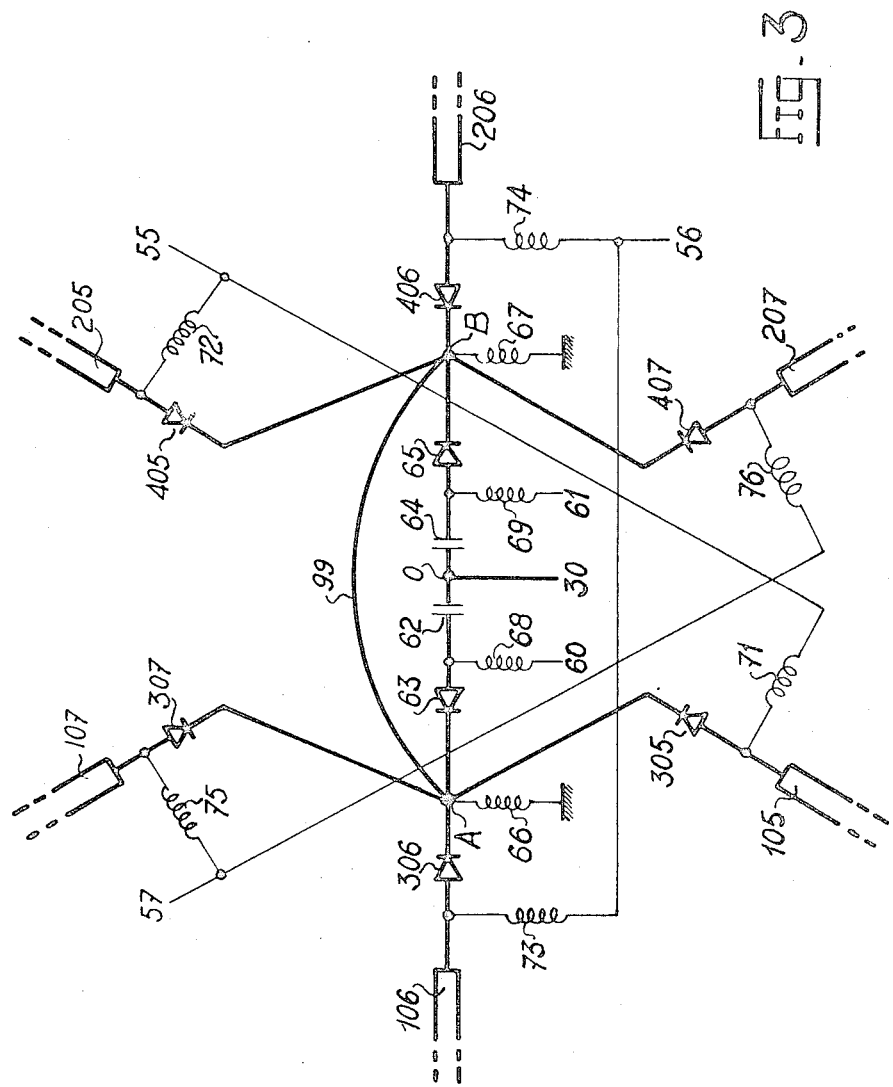
FIG. 3 is a diagram of an embodiment of the antenna switching device shown in FIG. 1.

In FIG. 3, in which for clarity's sake, the proper scale has not been observed between the different elements, there can be seen the three dipoles of the antenna 2 of the FIG. 1, the high frequency input 30 and the switching inputs 55, 56, 57, 60 and 61 of the switch 25 shown in FIG. 2.

The references 105 and 205, 106 and 206, 107 and 207 have been used to designate the respective pairs of half-dipoles making up the dipoles 5, 6 and 7. The designations are such that in moving in the same direction about the centre of symmetry 0 of the dipoles, the half-dipoles 105, 106, 107, 205, 206, 207 are respectively encountered. This point 0 is connected to a point A by a capacitor 62 followed by a diode 63, the latter diode being connected to the capacitor 62 with its anode. A symmetrical arrangement comprising a capacitor 64 and a diode 65 terminates at the point B which is symmetrical to A in relation to 0. The points B and A are furthermore respectively connected by a line section 99 which produces a phase shift of 180° in the high frequency.

The points A and B are furthermore respectively grounded across inductors 66 and 67

The junction between the capacitor 62 and the diode 63 is connected to the input 60 through an inductor 68, and the junction between the capacitor 64 and the diode 65, to the input 61 through an inductor 69.

The half-dipoles 105, 106 and 107 are connected to the point A by three diodes 305, 306 and 307 respectively which are connected head to tail in relation to the diode 63. The half-dipoles 205, 206 and 207 are connected to the point B respectively by three diodes 405, 406 and 407, connected head to tail in relation to the diode 65. The anodes of the diodes 305 and 405 are connected to the input 55 across respective inductors 71 and 72; the anodes of the diodes 306 and 406 are connected to the input 56 across respective inductors 73 and 74; and the anodes of the diodes 307 and 407 are connected to the input 57 across respective inductors 75 and 76.

The connections between the point A and the half-dipoles 105, 106 and 107, which have been represented with different lengths for drawing purposes, in reality have substantially the same length; the same applies to the connections between the point B and the half-dipoles 205, 206 and 207; in fact, the HF part of the switching device can be contained within a circle 10 mm in radius whilst the operating wavelength is in the order of 2.60 m.

All the inductors are high frequency chokes.

Disregarding the connections shown in thin line, which contain these inductors, the conductors which have been shown in thicker line define the high-frequency part of the system and are normally the inner conductors of coaxial cables whose outer conductors have not been shown.

The device operates as follows:

Let T designate the period of rotation of the rotating lobe.

The signal generator 26 (FIG. 2) produces at its outputs 35, 36 and 37 and thus applies to the inputs 55, 56 and 57 of the switching device 25, three trains of positive rectangular pulses of duration T/6, separated by spaces of T/3, the trains being out of phase with one another by T/6.

The generator 26 supplies at its outputs 40 and 41, and therefore applies to the inputs 60 and 61 of the switching device 25, two trains of positive rectangular pulses of duration T/2, separated by spaces of T/2, these latter two trains being in phase opposition with one another.

An operating cycle takes place in the following manner, (+) and (−) being respectively used to symbolise the rectangular pulses and the intervals separating them:

|           | 60 | 61 | 55 | 56 | 57 |
|-----------|----|----|----|----|----|
| 0 to T/6  | +  | −  | +  | −  | −  |
| T/6 to 2T/6 | + | − | − | + | − |
| 2T/6 to 3T/6 | + | − | − | − | + |
| 3T/6 to 3T/6 | − | + | + | − | − |
| 4T/6 to 5T/6 | − | + | − | + | − |
| 5T/6 to T | − | + | − | − | + |

It will immediately be apparent from the connections described that if the HF cables are given suitable lengths, then for the six sub-cycles of duration T/6, the following results are obtained. the dipoles 5, 6 and 7 are successively fed in phase with the omnidirectional antenna, and then successively fed in phase opposition therewith.

Thus there are six distinct positions of the cardioid pattern.

The device described lends itself readily to remote control.

Self-evidently, the invention is in no way limited to the embodiment described and illustrated here. In particular, the number of dipoles is not necessarily equal to three although this number is to be preferred since it enables the transmission circuit to be simplified while providing adequate accuracy of reception, without the need for any modification to conventional VOR receivers.

Of course, the invention is not limited to the embodiments described and shown which were given solely by way of example.

What is claimed is:

1. A radio beacon comprising first means for radiating a fixed lobe, and second means for radiating a rotating lobe forming with said fixed lobe a rotating cardioid radiation pattern, said second means including. an HF oscillator; $n$ dipoles, $n$ being an integer greater than 1, having the same centre of symmetry and regularly angularly spaced about said centre, said dipoles having respective input connections; and a switching device for, during each cycle corresponding to one revolution of said rotating lobe, successively supplying said $n$ dipoles from said HF oscillator during the course of the first half cycle and then repeating the operation by reversing the input connections of each of the dipoles, during the second half cycle.

2. A radio beacon as claimed in claim 1, wherein $n$ is equal to 3.

3. A radio beacon as claimed in claim 1, wherein said first means comprise two curved dipoles arranged on a circle and forming a constant-current loop.

4. A radio beacon as claimed in claim 1, wherein said n dipoles are centre-fed, each of them thus being split into a first and second half-dipole, the first three half-dipoles being adjacent and connected to one and the same point A through three diodes, the three second half-dipoles being connected to one and the same point B through three other diodes, said six diodes being referred to as dipole selector diodes; said points A and B being connected with one another on the one hand by a section of line which introduces a 180° phase-shift in the high frequency signal, and on the other hand by two other diodes, referred to as phase selection diodes, between which there terminates an HF feeder cable; said switching device comprising means for alternately driving the two phase selector diodes conductive for times of T/2, and means for successively driving the dipole selector diodes conductive, two diodes connected to one and the same dipole being simultaneously driven conductive for a duration of T/6, where T is the period of rotation of said rotating lobe.

* * * * *